March 13, 1962 R. J. ORRANGE 3,025,511

ANALOG-TO-DIGITAL CONVERTER SYSTEM

Filed June 30, 1959 2 Sheets-Sheet 1

INVENTOR.
ROBERT J. ORRANGE

BY Ralph R. Barnard
ATTORNEY

March 13, 1962 R. J. ORRANGE 3,025,511

ANALOG-TO-DIGITAL CONVERTER SYSTEM

Filed June 30, 1959 2 Sheets-Sheet 2

United States Patent Office 3,025,511

Patented Mar. 13, 1962

3,025,511

ANALOG-TO-DIGITAL CONVERTER SYSTEM

Robert J. Orrange, Apalachin, N.Y., assignor to International Business Machines Corporation, New York, N.Y., a corporation of New York Filed June 30, 1959, Ser. No. 823,866
6 Claims. (Cl. 340—347)

Figure 1:
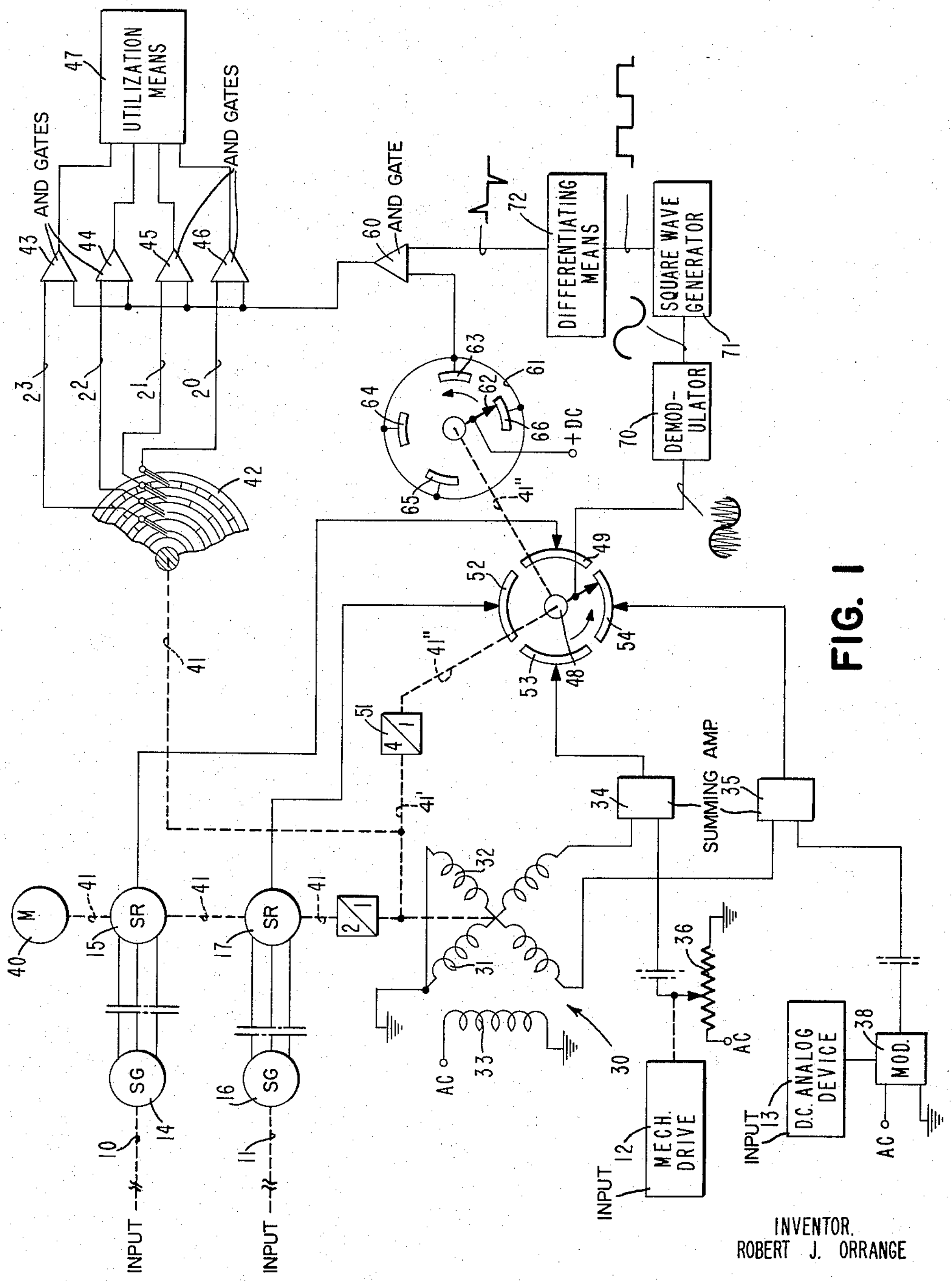

This invention relates to analog-to-digital information converter systems and more particularly to an analog-to-digital converter system for converting a plurality of analog quantities to a corresponding plurality of electrical digital signals.

Analog-to-digital converters are well known in the art and have wide uses in input and output operations for digital computer systems. They are particularly useful in digital systems wherein the time at which a particular analog signal is present is of significance to the solution of the digital computer system associated therewith. These analog signals can be characterized by their intrinsic composition. For example, some analog signals are manifested either by shaft angles (angular position) or as a linear position of a mechanical member. Still other analog signals may be characterized as represented by an A.C. or D.C. voltage magnitude with a phase angle or polarity which is meaningful.

Often, an analog signal may be converted from one of these representatives to another using well established analog computation techniques. Since one of the more widely used techniques for converting analog information to digital information involves a shaft digitizer having a mechanical shaft angle input and an electrical digital output, it is a common practice to initially convert all analog information to a shaft position prior to conversion.

A well known example of a shaft digitizer comprises a disc or drum having plural rings of conductive and non-conductive segments corresponding in number to the number of orders of significance, which it is desired that the electrical digital information have. Each conductive segment is energized from a common hub mounted on the shaft, which is positioned in accordance with the analog shaft information, and at least one brush is associated with each ring. In its simplest form, the first ring corresponding with the highest order of significance consists of one conductive and one non-conductive segment, while the next ring consists of two conductive and two non-conductive segments alternately arranged. Each succeeding ring contains twice the number of conductive and non-conductive segments as the next preceding ring. Accordingly, as the shaft on which the disc or drum is mounted is positioned to the analog shaft input, the presence or absence of voltages on the brushes represents an electrical binary digital representation of the position of the shaft.

While the shaft digitizer described hereinabove often provides adequate conversion of the analog shaft information to electrical digital information, it requires considerable space and adds a substantial amount of circuit complexity to a system because of non-ambiguous read-out techniques, which are required. Accordingly, when plural analog quantities are present within a system which must be converted to electrical binary digital information, the system complexity is usually very great because each analog shaft position to electrical digital conversion requires a separate shaft digitizer. Substantial savings in circuit complexity and component count could be obtained if the system requirement for shaft digitizers were reduced.

Accordingly, a primary object of the present invention is to provide a new and improved shaft position analog-to-digital converter technique for converting a plurality of analog quantities to a corresponding plurality of electrical digital signals.

It is an additional object of the present invention to provide a new and improved system for successively converting a plurality of analog quantities to a corresponding plurality of electrical digital signals utilizing only one shaft digitizer.

It is still another object of the present invention to provide a new and improved means for converting a plurality of shaft position analog quantities to a corresponding plurality of electrical digital signals utilizing only one shaft digitizer.

Other objects of the invention will be pointed out in the following description and claims and illustrated in the accompanying drawings which disclose, by way of examples, the principle of the invention and the best mode which has been contemplated of applying that principle.

Figure 2:
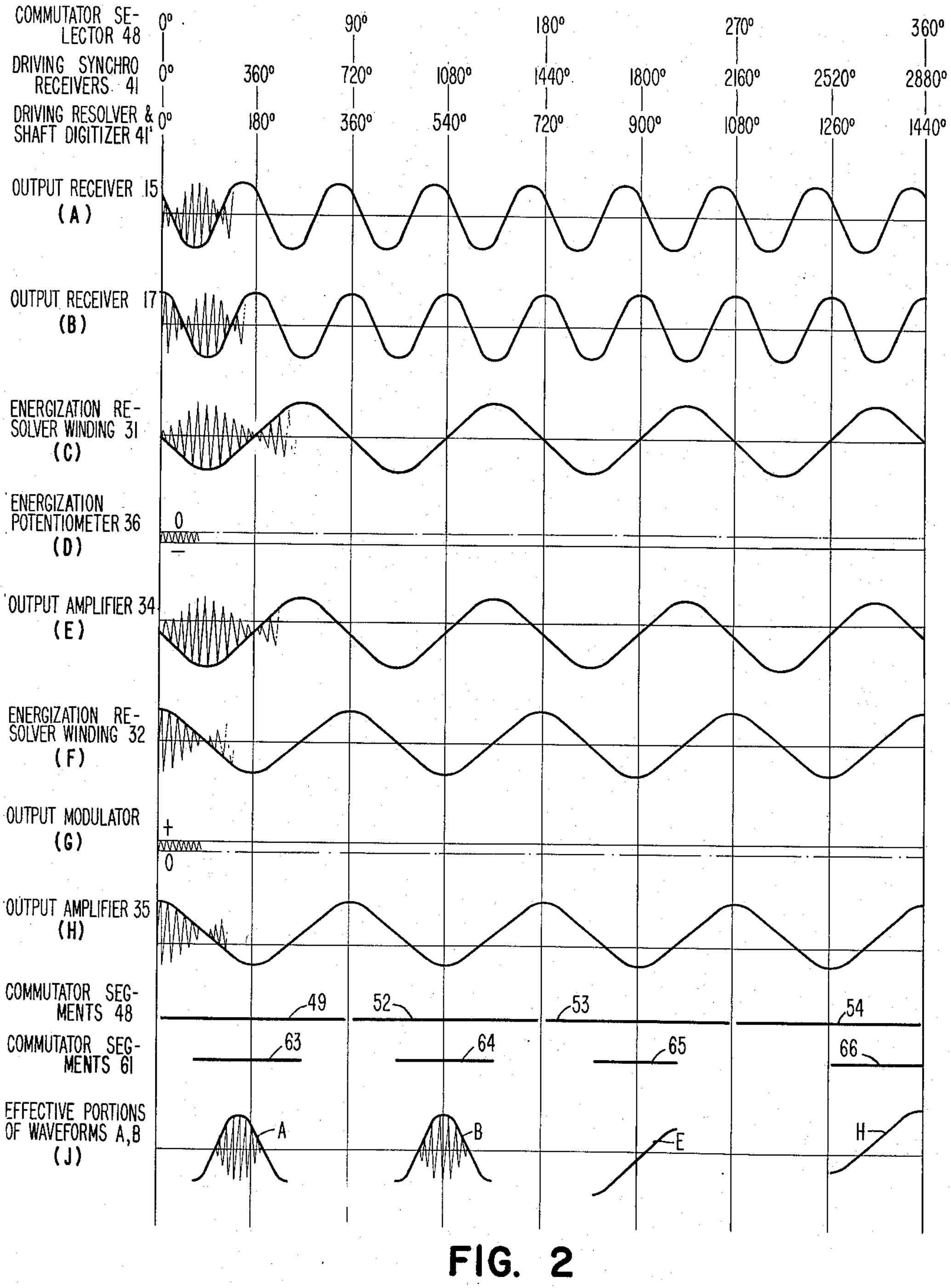

In the drawings:

FIG. 1 represents an electrical mechanical schematic of an exemplary plural analog quantity to a corresponding plurality of electrical digital signals utilizing one shaft digitizer in accordance with the teachings of the present invention; and FIG. 2 shows a plurality of waveforms of a selected boundary of the envelope of a corresponding plurality of approximately sinusoidal amplitude modulated A.C. carrier voltages, which are helpful in understanding the operation of FIG. 1.

Briefly, the present invention involves taking the electrical output from plural inductive type electromechanical devices exemplified by a synchro receiver and converting this information to electrical binary information. Each rotor is driven at the same constant rotational speed, while the electrical input of each inductive type electromechanical device is determined by a separate electrical analog quantity which it is desired to convert. The electrical output of each inductive type electromechanical device is then an A.C. voltage carrier having approximately sinusoidal amplitude modulation passing through zero (null) with a phase position dependent upon the magnitude of the electrical input. A shaft digitizer having an electrical binary output which may be instantaneously sampled is also driven at the same constant rotational speed as the plural inductive type electromechanical devices. During successive revolutions of all of the inductive type electromechanical devices and the shaft digitizer, the electrical output of one of these devices is monitored. All of the inductive type electromechanical devices will be interrogated after the completion of a number of revolutions corresponding to their number. The shaft digitizer is instantaneously sampled when the electromechanical device being monitored passes through a particular zero (null) indicating that the shaft input of the electromechanical devices corresponds to the analog quantity being converted.

Referring to FIG. 1, there is shown plural remote analog shaft positioning devices, the output of which is desired to convert to corresponding plural electrical digital information. For example, the angular position of shaft 10 represents one analog quantity, and the angular position of shaft 11 represents another analog quantity. In accordance with conventional techniques, the position of shaft 10 may be transmitted electrically by a conventional synchro generator 14 and synchro receiver 15 to the location where it is to be converted. Similarly, in accordance with conventional techniques, the angular position of shaft 11 is transmitted electrically by a conventional synchro generator 16 and synchro receiver 17 to the location where it is to be converted.

Mechanical device 12 is shown positioning the wiper of potentiometer 36, so as to derive a voltage thereon commensurate with the analog of its linear mechanical output. Potentiometer 36 is energized at one terminal by an A. C. voltage supply and is grounded at its other terminal. Mechanical device 12 may be any one of many well known linear positioning devices including a hand control.

A conventional A.C. modulator circuit 38 is shown connected to receive a D.C. voltage from a conventional D.C. analog device, so that the output from modulator 38 is an A.C. carrier with its amplitude modulated in accordance with the magnitude of the D.C. voltage. The A.C. voltage applied to the modulator as the carrier should be from the same A.C. voltage supply applied to potentiometer 36. D.C. analog device 13 may be any one of many conventional D.C. computation components or subsystems having a D.C. voltage output which it is desired to convert to electrical digital information.

In summary, synchro receivers 15 and 17 are each connected to receive an electrical input commensurate with an analog shaft position, which it is desired to convert to electrical digital information. As those skilled in the art are aware, a conventional synchro receiver is an inductive type electrical mechanical device and often comprises a stator on which is placed three electrical windings physically oriented 120° apart. Cooperating with the stator is a rotor on which a single winding is mounted for rotation. Accordingly, the synchro receiver operates by receiving an electrical A.C. voltage input on each of its three stator windings, so that a resultant A.C. magnetic flux vector is derived, which has an angular position in accordance with the analog shaft position of the input shaft of a synchro generator utilized to provide this electrical input. If the single winding on the rotor is not oriented at 90° with respect to this resultant A.C. magnetic flux vector, an A.C. voltage is induced in the rotor winding. Moreover, if the rotor is rotated at a constant speed, the A.C. voltage induced in the rotor will have an amplitude envelope, which varies in an approximately sinusoidal manner with a frequency determined by the rotation speed of the rotor. The angular phase position at which the carrier envelope goes through zero (null) varies as the three A.C. voltages applied to the stator windings vary the rotational position of the resultant A.C. magnetic flux in accordance with the analog shaft position input of the synchro generator.

Referring again to FIG. 1, the analog shaft position of shaft 10 causes conventional synchro generator 14 to apply three A.C. voltages to synchro receiver 15, so as to generate a resultant A.C. magnetic flux the rein having an angular orientation in accordance with the angular position of that shaft. The rotor of synchro receiver 15 is rotated by a conventional constant speed motor 40 through shaft 41. Hence, the voltage output from synchro receiver 15 consists of an A.C. voltage carrier with an amplitude envelope varying in an approximately sinusoidal manner at a frequency determined by the constant rotational speed which its rotor is driven. For every complete cycle of the carrier envelope, it passes through zero twice. The angular position of shaft 41 at which this occurs during one of these instances corresponds to analog shaft position 10, which it is desired to convert to electrical digital information. During the other occurrence when the sinusoidal amplitude envelope passes through zero, shafts 10 and 41 are 180° out of phase.

The present invention contemplates also driving a conventional shaft digitizer 42 by motor 40 through shaft 41 (and 41'). When the envelope of the A.C. carrier voltage output from synchro receiver 15 passes through the proper null, the instantaneous electrical digital output from shaft digitizer 42 may be sampled, and the corresponding electrical binary information is passed to a utilization means represented by block 47. Shaft digitizer 42 is shown with four exemplary alternately conducting and non-conducting rings and corresponding brushes for the $2^0$, $2^1$, $2^2$ and $2^3$ orders of binary significance. In order to provide this sampling action, one input of each of AND circuits 43—46 is connected to the brushes corresponding to the binary orders of significance $2^0$, $2^1$, $2^2$ and $2^3$, respectively.

At the precise time when it is desired to sample the output of shaft digitizer 42, a positive pulse is generated by circuitry to be described hereinafter and applied to the other input of each of the AND circuits. The other input of one or more of the AND circuits will also have a positive voltage or an up voltage level applied thereto in accordance with the electrical binary output of shaft digitizer 42, and this information is gated in parallel into the utilization means 47. As those skilled in the art will recognize, utilization means 47 may comprise a complete digital computer system including a buffer storage means for the purpose of temporarily preserving the parallel electrical binary information, which is sampled from the shaft digitizer 42. Alternatively, utilization means 47 might comprise merely a recording system for permanently or temporarily recording the sampled electrical binary outputs from the shaft digitizer 42.

Just as synchro receiver 15 is rotated at a constant rotational speed in synchronism with shaft digitizer 42, and its voltage output, monitored to detect when the angular position of shaft 42 corresponds to the angular position of input shaft position 10, additional inductive type electromechanical devices may be driven by the same motor 40 via shaft 41. Furthermore, the shaft digitizer 42, which is driven via same shaft 41, may be time shared over successive revolutions by the separate inductive type electromechanical devices, so as to provide an electrical binary information output during each revolution at a sample time corresponding to the time when shaft 41 (or 41') has an angular position which is the same as the angular position electrically defined by the particular type of electromechanical devices being interrogated.

The number of inductive type electromechanical devices, which may be driven in synchronism with shaft digitizer 42 at a constant rotational speed by motor 40, is a matter of choice within practical limits. Herein, it is desired to show how to convert four different analog quantities to electrical binary information while time sharing the same shaft digitizer 42. During each of four successive revolutions of shaft digitizer 42, one of the analog quantities is sampled. At a particular time, when shaft 41 (or 41') has a shaft position corresponding to the analog quantity to be converted, the electrical output of the shaft digitizer is sampled.

As indicated hereinabove, the electrical input to synchro receiver 15 is representative of one of the analog quantities to be converted, and it generates therein a resultant A.C. magnetic flux. This resultant A.C. magnetic flux is continually monitored by a rotor winding within the synchro receiver 15 and connected to its output. To provide the time sharing of shaft digitizer 42, this electrical output of synchro receiver 15 is connected as shown to one arcuate segment 49 of a commutator selector 48.

Because there are four analog quantities to be converted, commutator selector 48 contains four arcuate segments 49, 52, 53 and 54 spaced to electrically cooperate with rotating wiper 50. Wiper 50 is also rotated at a constant speed by motor 40 via shaft 41'' and gearing 51, so that it makes a quarter of a revolution, while shaft 41' and shaft digitizer 42 makes a full revolution.

As indicated above, the output of synchro receiver 15 is an approximately sinusoidal amplitude modulation of an A.C. voltage carrier with a frequency determined by the speed of rotation of shaft 41 and passes through zero (null) at an angular phase position determined by the rotational position of the resultant A.C. magnetic flux derived within synchro receiver 15 in accordance with the analog quantity (angular position of shaft 10) to be converted. This modulated A.C. voltage carrier is shown in FIG. 2 as waveform A.

Another analog quantity which it is desired to be converted to electrical binary information is depicted by shaft 11 and electrically transmitted to synchro receiver 17 by synchro generator 16. Accordingly, the resultant A.C. magnetic flux within receiver 17 derives an approximately sinusoidal amplitude modulation of an A.C. voltage carrier with a frequency determined by the speed of rotation of shaft 41 and which passes through zero (null) at an angular phase position determined by the angular orientation of the resultant A.C. magnetic flux. This modulated A.C. voltage carrier is shown as waveform B.

In order to illustrate that the teachings of the present invention are not restricted to analog quantities which are available as shaft positions, potentiometer 36 and modulator 38 are shown. Each has an A.C. carrier output with an amplitude commensurate with an analog quantity to be converted, which was initially defined in terms other than the angular position of a shaft. To convert to analog voltage outputs of potentiometer 36 and modulator 38 to an approximately sinusoidal amplitude modulation of the A.C. carrier voltage with a frequency determined by the constant speed of rotation of shaft 41' (in synchronism with shaft digitizer 42), each of these voltages is applied to one input of summing amplifiers 34 and 35, respectively. Summing amplifiers 34 and 35 may be of conventional construction exemplified by FIG. 18–49, page 664, of the textbook entitled Electronic and Radio Engineering, Electrical and Electronic Engineering Series, McGraw-Hill Book Company, Inc., New York, New York, 1955.

Conventional resolver 30 is shown with a single stator winding 33 energized by the A.C. voltage supply and two rotor windings 31 and 32 oriented at right angles with respect to one another. One terminal of each of these windings 31 and 32 is connected to ground, and the other terminal of each is connected to summing amplifiers 34 and 35, respectively. When the rotor of resolver 30 is rotated at a constant velocity by shaft 41' as shown, an approximately sinusoidal amplitude modulation A.C. carrier voltage is generated in each of said windings 31 and 32. Waveform C in FIG. 2 shows one boundary of the sinusoidal envelope of the voltage induced in winding 31. Waveform F of FIG. 2 shows one boundary of the sinusoidal envelope of the voltage induced in winding 32. It should be noted that since the windings 31 and 32 are physically displaced by 90°, the boundary waveforms C and F are displaced from one another by 90°.

The voltage carrier output from winding 31 is then applied to one input terminal of summing amplifier 34 in parallel with the voltage carrier output from potentiometer 36. The A.C. voltage carrier is shown as waveform D of FIG. 2. These two A.C. carrier voltages are then summed algebraically in amplifier 34 and applied to arcuate segment 53. Waveform E of FIG. 2 shows one boundary of the envelope of the sinusoidally modulated voltage applied to segment 53. It should be noted that the angular position at which waveform E passes through zero (null) is determined by the magnitude of the A.C. carrier voltage applied to summing amplifier 34 by potentiometer 36. Moreover, the frequency at which this boundary E of the carrier envelope varies is determined by the constant rotational speed of shaft 41'. It should be noted that the summation of voltage output from rotor winding 31 with the output of potentiometer 36, representing the analog quantity to be converted, provides a resultant boundary waveform E of the envelope of an A.C. carrier with the same characteristics as the voltage output from synchro receivers 15 and 16.

Similarly, the voltage output from rotor winding 32 is applied to one terminal of summing amplifier 34 in parallel with the voltage output from modulator 38 (the latter being shown as waveform G of FIG. 2). These two modulated carrier voltages are then summed algebraically in summing amplifier 35 and applied to arcuate segment 54. Waveform H of FIG. 2 shows one boundary of the envelope of the sinusoidally modulated A.C. voltage carrier applied to arcuate segment 54. It should be noted that the angular position at which waveform H passes through zero (null) is determined by the magnitude of the A.C. carrier voltage applied to summing amplifier 35 by modulator 38. The frequency at which the boundary of the carrier envelope varies is determined by the constant rotational speed of shaft 41'. Hence, the summation of the voltage output from rotor winding 32 with the output of modulator 38, representing the analog quantity to be converted, provides a resultant boundary waveform H of the envelope of an A.C. voltage carrier with the same characteristic as the voltage output from synchro receivers 15 and 16.

Resolver 30 with rotor winding 31, potentiometer 36 and summing amplifier 34 are thus the full functional equivalent of synchro receivers 15 and 17. Likewise, resolver 30 with rotor winding 32, modulator 38 and summing amplifier 35 are the full equivalent of synchro receivers 15 and 17.

As shaft 41' is rotated at a constant speed by motor 40 through a complete revolution, wiper 50 will rotate with respect to and pass over the entire arcuate segment 49. During this time, the voltage output from synchro receiver 15 is monitored by a null detection circuit to be described hereinafter for the purpose of determining when the angular shaft position of shaft 41' and shaft digitizer 42 corresponds to the analog quantity represented by shaft 10.

In like manner, during the next successive complete revolution of shaft 41' (and shaft digitizer 42), wiper 50 will make electrical contact with the entire arcuate segment 50, and the electrical output of synchro receiver 17 is monitored by the same null detection circuit for the purpose of determining when the angular shaft position of rotating shaft 41' corresponds to the analog quantity represented by the output from shaft 11.

Likewise, during the next successive complete revolution of shaft 41' and shaft digitizer 42, wiper 50 will make electrical contact with the entire arcuate segment 50, and the electrical output from summing amplifier 34 is monitored by the same null detection circuit to determine when the angular shaft position of shaft 41' corresponds to the analog quantity represented by the output from potentiometer 36.

Finally, during the next successive complete revolution of shaft 41' and shaft digitizer 42, wiper 50 will make electrical contact with the arcuate segment 54, and the electrical output from summing amplifier 35 is monitored by the same null detection circuit to determine when the angular shaft position of shaft 41' corresponds to the analog quantity represented by the output from modulator 38.

Thereafter, the monitoring and conversion cycles are repeated with respect to each arcuate segment and each analog quantity to be converted.

Each time the null detection circuit determines a correspondence between the analog quantity being interrogated and the angular position of shaft 41' (or 41), a positive pulse is generated in the output of AND circuit 60, so that AND circuits 43—46 gate the instantaneous electrical binary output from shaft digitizer 42 to the utilization means 47.

Referring again to FIG. 2, arcuate segments 49, 52, 53 and 54 are shown depicting the manner in which 360° of rotation of shaft 41' is divided by the cooperation of the wiper and wiper 50. It should be noted that shaft 41'' makes one quarter of a revolution, while shaft 41' (and shaft digitizer 42) are driven through one revolution. Shaft 41 is shown as being driven twice as fast as shaft 41' (and shaft digitizer 42), so that waveforms A and B of FIG. 2 have twice the frequency of waveforms E and H. This refinement is to negate the possibility that waveforms A and B will pass through a proper null and will have to be detected, while wiper 50 is close to the edges of the arcuate segments 49 and 52. If this were true, a degree of unreliability might exist.

Because of the double frequency of waveforms A and B, there is a likelihood that two correct nulls will be present during a complete rotation of shaft 41'. For this reason, an additional commutator selector 61 is utilized for arcuate segments 63—66 disposed through 360°, so as to cooperate with wiper 62, which is driven in synchronism with wiper 50. Wiper 52 is shown connected to a +D.C. voltage supply. All of the arcuate segments 63—66 are electrically commoned so that a positive voltage or up level is applied to AND circuit 60 whenever wiper 62 cooperates with one of the vernier segments. As a result of using the vernier commutator selector 61, only a portion of the approximately sinusoidal amplitude modulated carrier voltage appearing on wiper 50 for application to the null detection circuit is ultimately effective in selecting the sampling time of shaft digitizer 42.

Waveforms J of FIG. 2 show those portions of waveforms A, B, E and H, which are ultimately effective in selecting the sampling time of shaft digitizer 42. It should be understood, however, that the waveforms J do not represent the boundary of the envelope of the modulated A.C. carrier being applied to the null detection circuit during one revolution of shaft digitizer 42.

Referring again to FIG. 1, the null detection circuit is shown comprising a conventional demodulator, which functions to select the boundary of the approximately sinusoidal modulated A.C. carrier being applied thereto by selector 48. The waveforms shown adjacent the input and output of demodulator 70 depicts its function. By way of example, the synchronous detector is shown in Fig. 14.11, page 511, of a textbook entitled Waveforms, Radiation Laboratory Series, volume 19, McGraw-Hill Book Company, Inc., New York, New York, 1949. As a result of the use of the synchronous detector, an approximately sinusoidal voltage is then applied to a conventional square wave generator 71 for the purpose of generating a square wave passing through zero at the same phase position as approximately sinusoidal voltage. By way of example, square wave generator 71 may be a conventional Schmitt trigger.

The output of square wave generator 71 is then applied to a differentiating means 72, so as to generate positive and negative voltage spikes corresponding to the positive and negative slopes of the square wave input. In its simplest form, differentiating means 72 may comprise a conventional RC circuit. The application of a positive spike to AND circuit 60 at a time when wiper 62 is also applying a positive voltage to the other input thereof will result in a positive voltage pulse applied to AND circuits 43 and 46, so that the electrical binary output of shaft digitizer 42 is sampled and applied to utilization means 47.

It should be understood that the A.C. energization for each of the synchro generators and synchro receivers, the resolver, the potentiometer 36 and the modulator 38 should be from the same A.C. source to provide proper synchronism. Moreover, the energization of potentiometer 36 should be of a phase 180° displaced from the energization of stator winding 33 of resolver 30.

While shaft digitizer 42 is shown as an electrical brush commutator type, the equivalent optical and magnetic type shaft digitizer devices known in the art could also have been used. Non-ambiguity circuitry could be associated with the readout of shaft digitizer 42 as required. Equivalent switching devices could be substituted in place of the commutator selectors 48 and 61 shown.

While motor 40 has been described as a constant speed motor, it should be made clear that fundamental teachings of the present invention require only the shaft input to each inductive type electromechanical device be in synchronism with the shaft input to the others and the conventional analog shaft to electrical digital converter exemplified by the brush type shaft digitizers shown. In many practical embodiments, it may be desirable, however, that the rotational speed of the drive means be regulated to + or −10% in order for the detection and switching circuitry to work properly.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An analog-to-digital converter for plural analog quantities comprising plural inductive type electromechanical devices corresponding in number to the number of plural analog quantities to be converted, each of said inductive type electromechanical devices including a shaft input, an electrical input, an electrical output, said electrical output comprising an approximately sinusoidal amplitude modulated A.C. voltage carrier passing through null with a phase position dependent upon said electrical input, a drive means, a single shaft analog to electrical digital information converter, said analog to electrical digital converter and said input shaft of each inductive type electromechanical device being driven in synchronism by said drive means, electromechanical selection means operating in synchronism with said drive means so as to connect said electrical output of each of said inductive type electromechanical devices for monitoring the voltage output thereof during successive revolutions of the shaft input by said drive means, a detector means cooperating with said electromechanical selection means for detecting when the output of said inductive electromechanical device being monitored passes through a null indicating that said shaft input has an angular position corresponding to the analog quantity represented by said electrical input, means responsive to said detection means for instantaneous sampling the electrical output of said analog to digital converter on the occurrence of the null.

2. An analog-to-digital converter for plural analog quantities as set forth in claim 1, wherein at least one of said plural inductive type electromechanical devices comprises a synchro receiver.

3. An analog-to-digital converter for plural analog quantities as set forth in claim 1, wherein at least one of said plural inductive type electromechanical devices comprises an A.C. voltage source, a resolver energized by said A.C. voltage source having one rotor winding, a source of A.C. voltage in electrical synchronism with said A.C. source having an amplitude commensurate with one of the analog quantities to be converted and a summing amplifier responsive to the output of said rotor winding and said A.C. source having an amplitude commensurate with the analog quantity to be converted.

4. An analog-to-digital converter for plural analog quantities as set forth in claim 1, wherein a utilization means is made responsive to said analog-to-digital converter for utilizing the electrical binary information applied thereto from said converter as a result of sampling the electrical output thereof on the occurrence of a null.

5. An analog-to-digital converter for plural analog quantities comprising plural inductive type electromechanical devices, each having a shaft input, an electrical input and an electrical output; said electrical output comprising an A.C. voltage carrier having approximately sinusoidal modulation thereon which passes through null at an angular position determined by said electrical input; a drive means, a single shaft analog-to-electrical digital information converter; said analog-to-digital converter and said input shaft of each inductive mechanical device being driven in synchronism by said drive means; electrical mechanical selection means also being driven by said driving means and connected to the electrical output of each of said inductive electrical mechanical devices for successively monitoring the voltage output thereof during a revolution of the shaft input of said electrical mechanical devices; sensing means responsive to said electrical mechanical selection means for detecting when said electrical output of said inductive electrical mechanical device passes through a null indicating that said shaft input has an angular position corresponding to the analog quantity represented by said electrical input for the purpose of instantaneously sampling the electrical output of said analog-to-digital converter.

6. The analog-to-digital converter for plural analog quantities comprising plural inductive electrical mechanical devices as set forth in claim 5, wherein a utilization means is connected to be responsive to said analog-to-digital converter during successive revolutions thereof.

No references cited.